United States Patent
Mitani et al.

(10) Patent No.: US 12,071,251 B2
(45) Date of Patent: Aug. 27, 2024

(54) POWER SUPPLY CIRCUIT OF MOVING OBJECT

(71) Applicant: HONDA MOTOR CO., LTD., Tokyo (JP)

(72) Inventors: Manabu Mitani, Wako (JP); Sadao Shinohara, Wako (JP); Masataka Yoshida, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 36 days.

(21) Appl. No.: 18/166,542

(22) Filed: Feb. 9, 2023

(65) Prior Publication Data

US 2023/0257129 A1 Aug. 17, 2023

(30) Foreign Application Priority Data

Feb. 14, 2022 (JP) .................................. 2022-020410
Dec. 27, 2022 (JP) ................................. 2022-209540

(51) Int. Cl.
*B64D 27/24* (2024.01)
*H01H 50/54* (2006.01)

(52) U.S. Cl.
CPC ........... *B64D 27/24* (2013.01); *H01H 50/546* (2013.01); *B64D 2221/00* (2013.01)

(58) Field of Classification Search
CPC .... B64D 27/24; B64D 2221/00; H01H 50/54; H01H 50/546
See application file for complete search history.

(56) References Cited

U.S. PATENT DOCUMENTS

2020/0180454 A1   6/2020 Gao et al.

*Primary Examiner* — Robert L DeBeradinis
(74) *Attorney, Agent, or Firm* — Rankin, Hill & Clark LLP

(57) ABSTRACT

A power supply circuit of an aircraft includes: a first contactor that is provided on a first power transmission path for transmitting electric power from a first power source to a load and switches between a conduction state and an interruption state between the first power source and the load; and a second contactor that is provided on a second power transmission path for transmitting electric power from a second power source to the load and switches between the conduction state and the interruption state between the second power source and the load. The first contactor includes a first fixed contact and a first movable contact, and the second contactor includes a second fixed contact and a second movable contact. The moving direction of the first movable contact intersects with the moving direction of the second movable contact.

5 Claims, 6 Drawing Sheets

POWER SUPPLY CIRCUIT OF MOVING OBJECT

CROSS-REFERENCE TO RELATED APPLICATIONS

This application is based upon and claims the benefit of priority from Japanese Patent Applications No. 2022-020410 filed on Feb. 14, 2022 and No. 2022-209540 filed on Dec. 27, 2022, the contents of which are incorporated herein by reference.

BACKGROUND OF THE INVENTION

Field of the Invention

The present invention relates to a power supply circuit of a moving object.

Description of the Related Art

US 2020/0180454 A1 discloses a power supply circuit of an aircraft, which is a moving object. The power supply circuit can transmit electric power from both a generator and a battery to a load. In the power supply circuit, a contactor is provided in a power transmission path for transmitting electricity from the generator to the load. A contactor is also provided in a power transmission path for transmitting electricity from the battery to the load.

SUMMARY OF THE INVENTION

In the power supply circuit of the moving object disclosed in US 2020/0180454 A1, when an excessive impact is applied to the moving object, each of a plurality of contactors may operate due to the impact. In this case, the supply of electric power from the generator to the load may be interrupted, and the supply of electric power from the battery to the load may also be interrupted. In such a case, there arises a problem that electric power cannot be supplied to the load.

An object of the present invention is to solve the above-mentioned problem.

According to an aspect of the present invention, there is provided a power supply circuit of a moving object, the power supply circuit comprising: a first power transmission path configured to transmit electric power from a first power source to a load; a second power transmission path configured to transmit electric power from a second power source to the load; a first contactor provided on the first power transmission path and configured to switch between a conduction state in which electricity flows and an interruption state in which flow of electricity is interrupted, between the first power source and the load; and a second contactor provided on the second power transmission path and configured to switch between the conduction state and the interruption state, between the second power source and the load, wherein the first contactor includes a first fixed contact, and a first movable contact configured to move relative to the first fixed contact, the second contactor includes a second fixed contact, and a second movable contact configured to move relative to the second fixed contact, and a moving direction of the first movable contact intersects with a moving direction of the second movable contact.

According to the present invention, electric power can be supplied to the load even when an excessive impact is applied to the moving object.

The above and other objects, features, and advantages of the present invention will become more apparent from the following description when taken in conjunction with the accompanying drawings, in which a preferred embodiment of the present invention is shown by way of illustrative example.

DETAILED DESCRIPTION OF THE INVENTION

First Embodiment

[Configuration of Power Supply Circuit]

Figure 1:
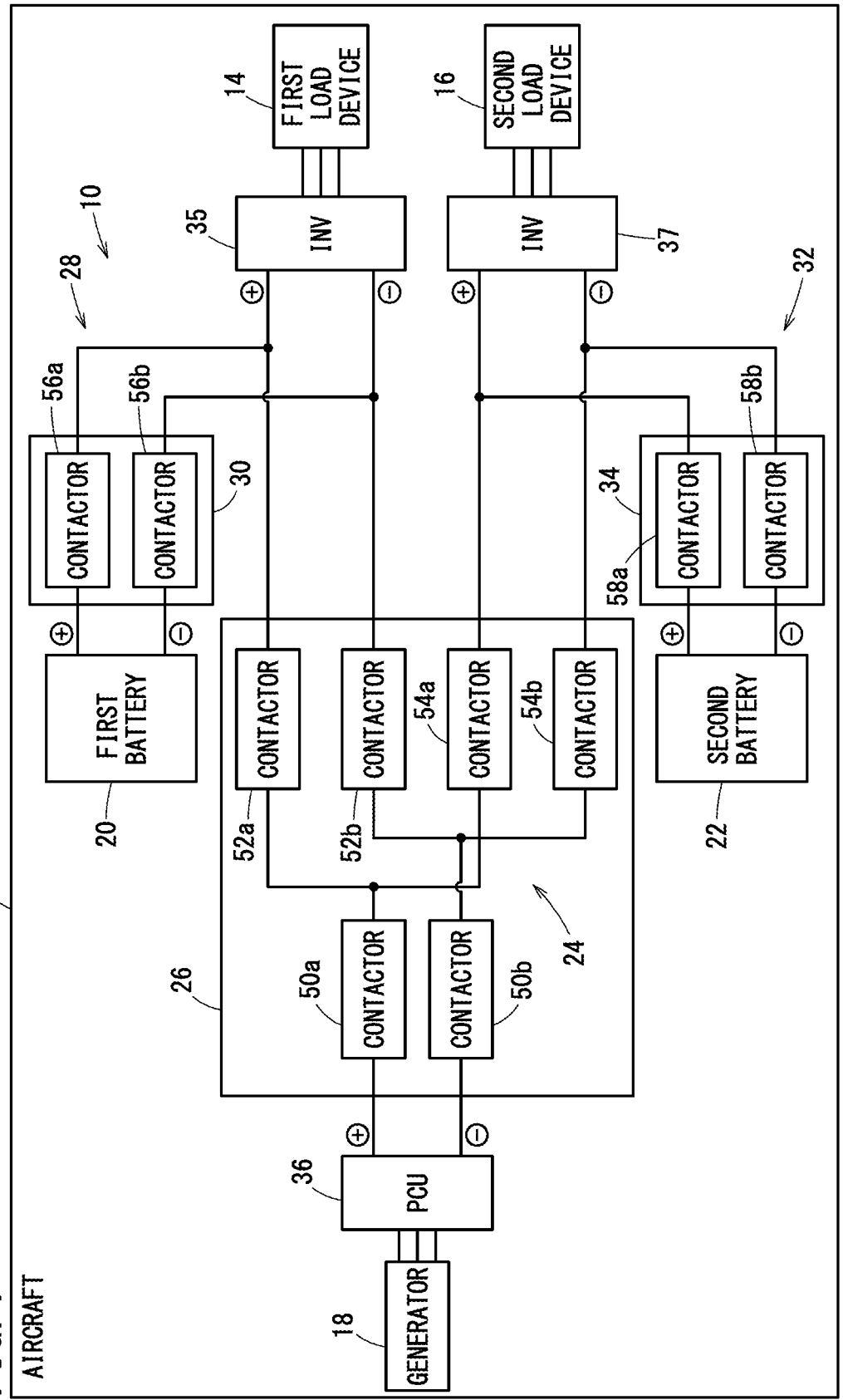
FIG. 1 is a circuit diagram of a power supply circuit.

FIG. 1 is a circuit diagram of a power supply circuit 10. The power supply circuit 10 is mounted on an aircraft 12. The aircraft 12 corresponds to a moving object of the present invention.

The aircraft 12 includes a first load device 14 and a second load device 16. The first load device 14 is, for example, a vertical thruster that generates a propulsive force in a vertical direction for the aircraft 12. The second load device 16 is, for example, a horizontal thruster that generates a propulsive force in a horizontal direction for the aircraft 12. Each of the first load device 14 and the second load device 16 corresponds to a load of the present invention.

The aircraft 12 includes a generator 18, a first battery 20, and a second battery 22. Each of the first load device 14 and the second load device 16 is driven by electric power generated by the generator 18. The first load device 14 is driven by electric power stored in the first battery 20. The second load device 16 is driven by electric power stored in the second battery 22. The generator 18 corresponds to a first power source of the present invention. Each of the first battery 20 and the second battery 22 corresponds to a second power source of the present invention.

The power supply circuit 10 includes a first power transmission path 24. The first power transmission path 24 is configured to supply electric power from the generator 18 to each of the first load device 14 and the second load device 16.

The first power transmission path 24 is provided with a main junction box 26. The main junction box 26 includes a contactor 50*a* and a contactor 50*b*.

The contactor 50*a* is provided on the positive line of the first power transmission path 24. Between the generator 18 and the first load device 14, the contactor 50*a* switches between a conduction state in which electricity flows and an interruption state in which the flow of electricity is interrupted. Furthermore, between the generator 18 and the second load device 16, the contactor 50*a* switches between a conduction state in which electricity flows and an interruption state in which the flow of electricity is interrupted. The contactor 50*a* corresponds to a first contactor of the present invention.

The contactor 50*b* is provided on the negative line of the first power transmission path 24. Between the generator 18 and the first load device 14, the contactor 50*b* switches between a conduction state in which electricity flows and an interruption state in which the flow of electricity is interrupted. Furthermore, between the generator 18 and the second load device 16, the contactor 50b switches between a conduction state in which electricity flows and an interruption state in which the flow of electricity is interrupted. The contactor 50b corresponds to a third contactor of the present invention.

When any one of the contactor 50a or the contactor 50b is in the interruption state, electric power is not supplied from the generator 18 to each of the first load device 14 and the second load device 16.

The main junction box 26 includes a contactor 52a and a contactor 52b. The contactor 52a is provided on the positive line of the first power transmission path 24. Between the generator 18 and the first load device 14, the contactor 52a switches between a conduction state in which electricity flows and an interruption state in which the flow of electricity is interrupted. The contactor 52b is provided on the negative line of the first power transmission path 24. Between the generator 18 and the first load device 14, the contactor 52b switches between a conduction state in which electricity flows and an interruption state in which the flow of electricity is interrupted. When any one of the contactor 52a or the contactor 52b is in the interruption state, electric power is not supplied from the generator 18 to the first load device 14.

The main junction box 26 includes a contactor 54a and a contactor 54b. The contactor 54a is provided on the positive line of the first power transmission path 24.

Between the generator 18 and the second load device 16, the contactor 54a switches between a conduction state in which electricity flows and an interruption state in which the flow of electricity is interrupted. The contactor 54b is provided on the negative line of the first power transmission path 24. Between the generator 18 and the second load device 16, the contactor 54b switches between a conduction state in which electricity flows and an interruption state in which the flow of electricity is interrupted. When any one of the contactor 54a or the contactor 54b is in the interruption state, electric power is not supplied from the generator 18 to the second load device 16.

The power supply circuit 10 includes a second power transmission path 28. The second power transmission path 28 is configured to supply electric power from the first battery 20 to the first load device 14.

The second power transmission path 28 is provided with a first battery junction box 30. The first battery junction box 30 includes a contactor 56a and a contactor 56b.

The contactor 56a is provided on the positive line of the second power transmission path 28. Between the first battery 20 and the first load device 14, the contactor 56a switches between a conduction state in which electricity flows and an interruption state in which the flow of electricity is interrupted. The contactor 56b is provided on the negative line of the second power transmission path 28. Between the first battery 20 and the first load device 14, the contactor 56b switches between a conduction state in which electricity flows and an interruption state in which the flow of electricity is interrupted. When any one of the contactor 56a or the contactor 56b is in the interruption state, electric power is not supplied from the first battery 20 to the first load device 14. The contactor 56a corresponds to a second contactor of the present invention. The contactor 56b corresponds to a fourth contactor of the present invention.

The power supply circuit 10 includes a third power transmission path 32. The third power transmission path 32 is configured to supply electric power from the second battery 22 to the second load device 16.

The third power transmission path 32 is provided with a second battery junction box 34. The second battery junction box 34 includes a contactor 58a and a contactor 58b.

The contactor 58a is provided on the positive line of the third power transmission path 32. Between the second battery 22 and the second load device 16, the contactor 58a switches between a conduction state in which electricity flows and an interruption state in which the flow of electricity is interrupted. The contactor 58b is provided on the negative line of the third power transmission path 32. Between the second battery 22 and the second load device 16, the contactor 58b switches between a conduction state in which electricity flows and an interruption state in which the flow of electricity is interrupted. When any one of the contactor 58a or the contactor 58b is in the interruption state, electric power is not supplied from the second battery 22 to the second load device 16. The contactor 58a corresponds to a second contactor of the present invention. The contactor 58b corresponds to a fourth contactor of the present invention.

A power control unit (hereinafter referred to as PCU) 36 is provided between the generator 18 and the power supply circuit 10. The PCU 36 controls voltage and current. The PCU 36 steps up and down the voltage. The PCU 36 converts the AC power generated by the generator 18 into DC power and outputs the DC power to the first power transmission path 24. The PCU 36 converts the DC power supplied from the first battery 20 or the second battery 22 into AC power, and outputs the AC power to the generator 18.

An inverter 35 is provided between the first load device 14 and the power supply circuit 10. Further, an inverter 37 is provided between the second load device 16 and the power supply circuit 10. The inverter 35 and the inverter 37 control voltage and current. The inverter 35 and the inverter 37 step up and down the voltage. The inverter 35 and the inverter 37 convert the DC power supplied from the PCU 36, the first battery 20, and the second battery 22 into AC power, and output the AC power to the first load device 14 and the second load device 16, respectively.

The power supply circuit 10 may include elements such as a sensor, a fuse, a breaker, a diode, a transistor, a resistor, a coil, and a capacitor. Each of the first battery 20 and the second battery 22 may be a capacitor. Further, a pre-charge circuit may be provided between the first battery 20 and the first load device 14. Similarly, a pre-charge circuit may be provided between the second battery 22 and the second load device 16.

[Configuration of Contactor]

Figure 2:
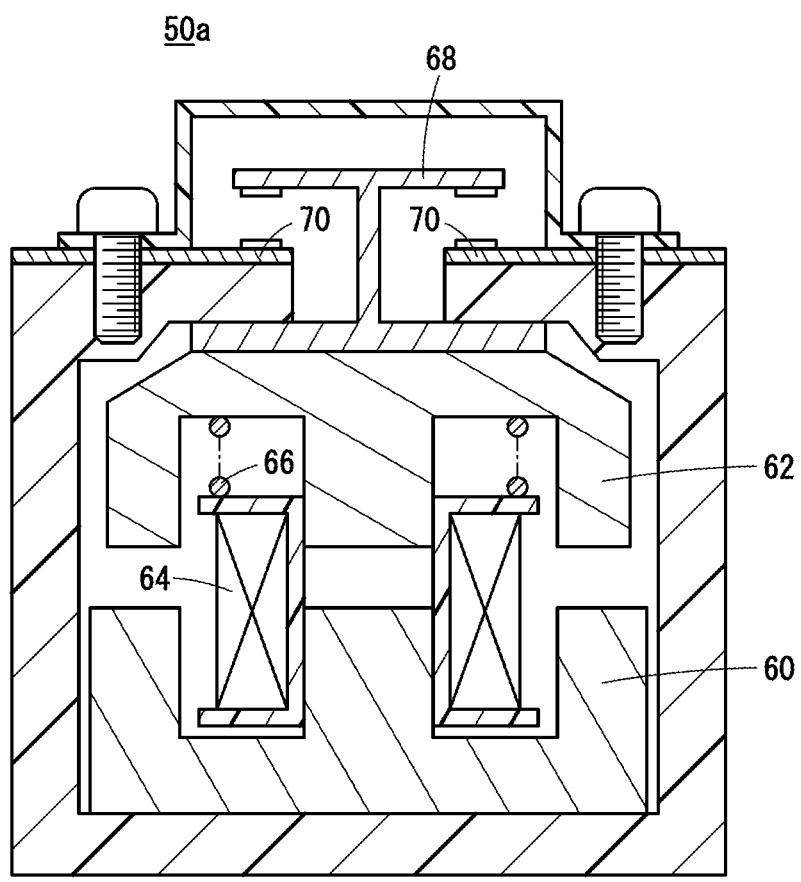
FIG. 2 is a schematic diagram of a contactor.

FIG. 2 is a schematic diagram of the contactor 50a. The contactor 50a includes a fixed iron core 60, a movable iron core 62, a coil 64, and a spring 66. The movable iron core 62 moves relative to the fixed iron core 60. When a current flows through the coil 64, the fixed iron core 60 is excited. In this case, the movable iron core 62 moves in a direction approaching the fixed iron core 60 by the magnetic force of the fixed iron core 60. When no current flows through the coil 64, the fixed iron core 60 is not excited. In this case, the movable iron core 62 moves in a direction away from the fixed iron core 60 by the biasing force of the spring 66.

The contactor 50a includes a movable contact 68 and two fixed contacts 70. The movable contact 68 moves together with the movable iron core 62. When the movable iron core 62 moves in a direction approaching the fixed iron core 60, the movable contact 68 moves in a direction approaching the two fixed contacts 70. In this case, the two fixed contacts 70 are connected by the movable contact 68. As a result, the contactor 50a is brought into a conduction state. When the movable iron core 62 moves in a direction away from the fixed iron core 60, the movable contact 68 moves in a direction away from the two fixed contacts 70. In this case, the connection between the two fixed contacts 70 is interrupted. As a result, the contactor 50a is brought into an interruption state.

Although the configuration of the contactor 50a has been described above, the configurations of the contactor 50b, the contactor 52a, the contactor 52b, the contactor 54a, the contactor 54b, the contactor 56a, the contactor 56b, the contactor 58a, and the contactor 58b are the same.

The movable contact 68 in the contactor 50a corresponds to a first movable contact of the present invention. The movable contact 68 in each of the contactor 56a and the contactor 58a corresponds to a second movable contact of the present invention. The movable contact 68 in the contactor 50b corresponds to a third movable contact of the present invention. The movable contact 68 in each of the contactor 56b and the contactor 58b corresponds to a fourth movable contact of the present invention. The fixed contact 70 in the contactor 50a corresponds to a first fixed contact of the present invention. The fixed contact 70 in each of the contactor 56a and the contactor 58a corresponds to a second fixed contact of the present invention. The fixed contact 70 in the contactor 50b corresponds to a third fixed contact of the present invention. The fixed contact 70 in each of the contactor 56b and the contactor 58b corresponds to a fourth fixed contact of the present invention.

Hereinafter, a state where each of the contactor 50a, the contactor 50b, the contactor 52a, the contactor 52b, the contactor 54a, the contactor 54b, the contactor 56a, the contactor 56b, the contactor 58a, and the contactor 58b is in the conduction state may be referred to as ON. Further a state where each of the contactor 50a, the contactor 50b, the contactor 52a, the contactor 52b, the contactor 54a, the contactor 54b, the contactor 56a, the contactor 56b, the contactor 58a, and the contactor 58b is in the interruption state may be referred to as OFF.

Figure 3:
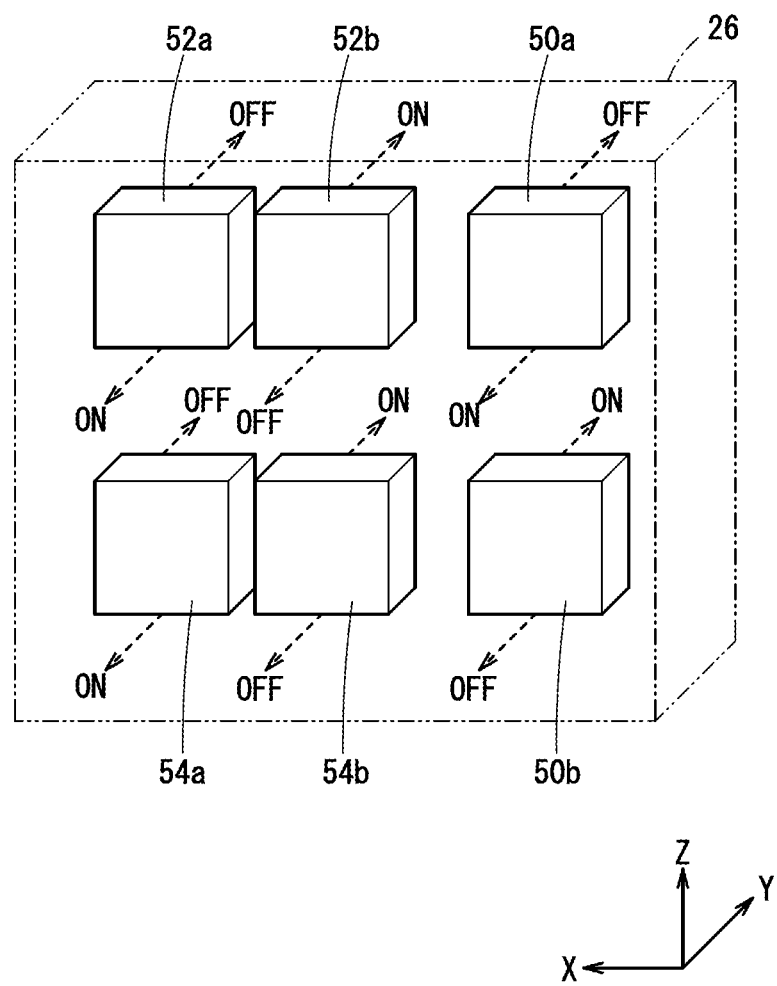
FIG. 3 is a schematic diagram of a main junction box.

FIG. 3 is a schematic diagram of the main junction box 26. An X-axis direction indicated by an arrow in FIG. 3 indicates the front-rear direction of the aircraft 12. A Y-axis direction indicated by an arrow in FIG. 3 indicates the width direction of the aircraft 12. A Z-axis direction indicated by an arrow in FIG. 3 indicates the vertical direction of the aircraft 12.

An ON direction indicated by an arrow in FIG. 3 indicates a direction in which the movable contact 68 approaches the fixed contacts 70 in each contactor of the main junction box 26. An OFF direction indicated by an arrow in FIG. 3 indicates a direction in which the movable contact 68 moves away from the fixed contacts 70 in each contactor of the main junction box 26. Each contactor of the main junction box 26 refers to the contactor 50a, the contactor 50b, the contactor 52a, the contactor 52b, the contactor 54a, and the contactor 54b.

In the contactor 50a, the direction in which the movable contact 68 approaches the fixed contacts 70 is the Y-axis direction negative side. In the contactor 50a, the direction in which the movable contact 68 moves away from the fixed contacts 70 is the Y-axis direction positive side. In the contactor 50b, the direction in which the movable contact 68 approaches the fixed contacts 70 is the Y-axis direction positive side. In the contactor 50b, the direction in which the movable contact 68 moves away from fixed contacts 70 is the Y-axis direction negative side.

That is, the direction in which the movable contact 68 approaches the fixed contacts 70 in the contactor 50a is opposite to the direction in which the movable contact 68 approaches the fixed contacts 70 in the contactor 50b. In other words, the angle formed by the direction in which the movable contact 68 approaches the fixed contacts 70 in the contactor 50a and the direction in which the movable contact 68 approaches the fixed contacts 70 in the contactor 50b is 180°.

In the contactor 52a, the direction in which the movable contact 68 approaches the fixed contacts 70 is the Y-axis direction negative side. In the contactor 52a, the direction in which the movable contact 68 moves away from the fixed contacts 70 is the Y-axis direction positive side. In the contactor 52b, the direction in which the movable contact 68 approaches the fixed contacts 70 is the Y-axis direction positive side. In the contactor 52b, the direction in which the movable contact 68 moves away from the fixed contacts 70 is the Y-axis direction negative side.

That is, the direction in which the movable contact 68 approaches the fixed contacts 70 in the contactor 52a is opposite to the direction in which the movable contact 68 approaches the fixed contacts 70 in the contactor 52b. In other words, the angle formed by the direction in which the movable contact 68 approaches the fixed contacts 70 in the contactor 52a and the direction in which the movable contact 68 approaches the fixed contacts 70 in the contactor 52b is 180°.

In the contactor 54a, the direction in which the movable contact 68 approaches the fixed contacts 70 is the Y-axis direction negative side. In the contactor 54a, the direction in which the movable contact 68 moves away from the fixed contacts 70 is the Y-axis direction positive side. In the contactor 54b, the direction in which the movable contact 68 approaches the fixed contacts 70 is the Y-axis direction positive side. In the contactor 54b, the direction in which the movable contact 68 moves away from the fixed contacts 70 is the Y-axis direction negative side.

That is, the direction in which the movable contact 68 approaches the fixed contacts 70 in the contactor 54a is opposite to the direction in which the movable contact 68 approaches the fixed contacts 70 in the contactor 54b. In other words, the angle formed by the direction in which the movable contact 68 approaches the fixed contacts 70 in the contactor 54a and the direction in which the movable contact 68 approaches the fixed contacts 70 in the contactor 54b is 180°.

Figure 4:
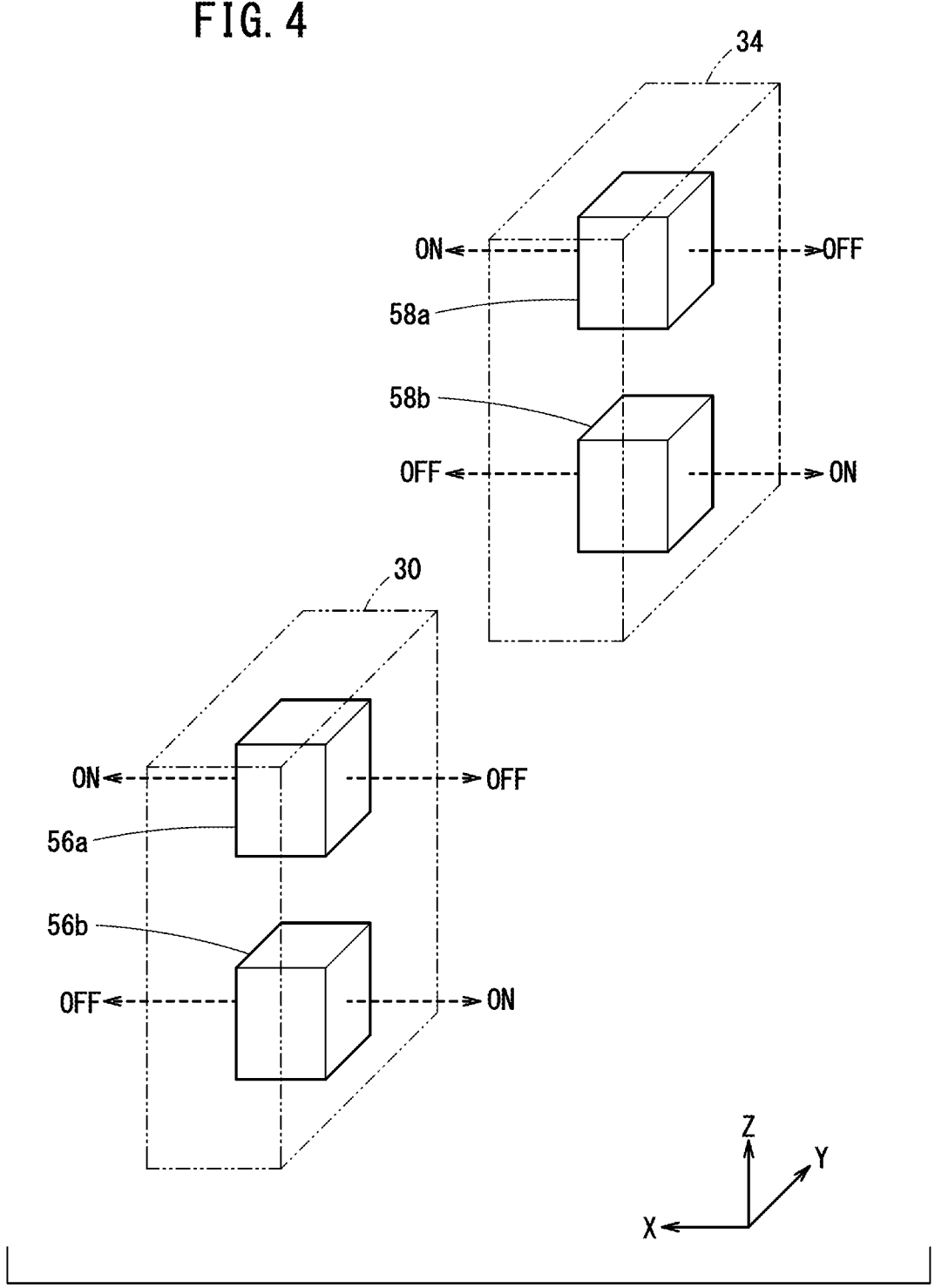
FIG. 4 is a schematic diagram of a first battery junction box and a second battery junction box.

FIG. 4 is a schematic diagram of the first battery junction box 30 and the second battery junction box 34. An X-axis direction indicated by an arrow in FIG. 4 indicates the front-rear direction of the aircraft 12. A Y-axis direction indicated by an arrow in FIG. 4 indicates the width direction of the aircraft 12. A Z-axis direction indicated by an arrow in FIG. 4 indicates the vertical direction of the aircraft 12.

An ON direction indicated by an arrow in FIG. 4 indicates a direction in which the movable contact 68 approaches the fixed contacts 70 in each contactor of the first battery junction box 30. An OFF direction indicated by an arrow in FIG. 4 indicates a direction in which the movable contact 68 moves away from the fixed contacts 70 in each contactor of the first battery junction box 30. Each contactor of the first battery junction box 30 refers to the contactor 56a and the contactor 56b.

An ON direction indicated by an arrow in FIG. 4 indicates a direction in which the movable contact 68 approaches the fixed contacts 70 in each contactor of the second battery junction box 34. An OFF direction indicated by an arrow in FIG. 4 indicates a direction in which the movable contact 68 moves away from the fixed contacts 70 in each contactor of the second battery junction box 34. Each contactor of the second battery junction box 34 refers to the contactor 58*a* and the contactor 58*b*.

In the contactor 56*a*, the direction in which the movable contact 68 approaches the fixed contacts 70 is the X-axis direction positive side. In the contactor 56*a*, the direction in which the movable contact 68 moves away from the fixed contacts 70 is the X-axis direction negative side. In the contactor 56*b*, the direction in which the movable contact 68 approaches the fixed contacts 70 is the X-axis direction negative side. In the contactor 56*b*, the direction in which the movable contact 68 moves away from the fixed contacts 70 is the X-axis direction positive side.

That is, the direction in which the movable contact 68 approaches the fixed contacts 70 in the contactor 56*a* is opposite to the direction in which the movable contact 68 approaches the fixed contacts 70 in the contactor 56*b*. In other words, the angle formed by the direction in which the movable contact 68 approaches the fixed contacts 70 in the contactor 56*a* and the direction in which the movable contact 68 approaches the fixed contacts 70 in the contactor 56*b* is 180°.

The moving direction of the movable contact 68 in each contactor of the first battery junction box 30 is the X-axis direction. On the other hand, as shown in FIG. 3, the moving direction of the movable contact 68 in each contactor of the main junction box 26 is the Y-axis direction.

That is, the moving direction of the movable contact 68 in each contactor of the first battery junction box 30 intersects with the moving direction of the movable contact 68 in each contactor of the main junction box 26. In other words, the angle formed by the moving direction of the movable contact 68 in each contactor of the first battery junction box 30 and the moving direction of the movable contact 68 in each contactor of the main junction box 26 is 90°.

In the contactor 58*a*, the direction in which the movable contact 68 approaches the fixed contacts 70 is the X-axis direction positive side. In the contactor 58*a*, the direction in which the movable contact 68 moves away from the fixed contacts 70 is the X-axis direction negative side. In the contactor 58*b*, the direction in which the movable contact 68 approaches the fixed contacts 70 is the X-axis direction negative side. In the contactor 58*b*, the direction in which the movable contact 68 moves away from the fixed contacts 70 is the X-axis direction positive side.

That is, the direction in which the movable contact 68 approaches the fixed contacts 70 in the contactor 58*a* is opposite to the direction in which the movable contact 68 approaches the fixed contacts 70 in the contactor 58*b*. In other words, the angle formed by the direction in which the movable contact 68 approaches the fixed contacts 70 in the contactor 58*a* and the direction in which the movable contact 68 approaches the fixed contacts 70 in the contactor 58*b* is 180°.

The moving direction of the movable contact 68 in each contactor of the second battery junction box 34 is the X-axis direction. On the other hand, as shown in FIG. 3, the moving direction of the movable contact 68 in each contactor of the main junction box 26 is the Y-axis direction.

That is, the moving direction of the movable contact 68 in each contactor of the second battery junction box 34 intersects with the moving direction of the movable contact 68 in each contactor of the main junction box 26. In other words, the angle formed by the moving direction of the movable contact 68 in each contactor of the second battery junction box 34 and the moving direction of the movable contact 68 in each contactor of the main junction box 26 is 90°.

Advantageous Effects

The contactor 50*a* is switched between the conduction state and the interruption state by movement of the movable contact 68 relative to the fixed contacts 70. When an excessive impact is applied to the aircraft 12, the impact may cause the movable contact 68 to move. In this case, there is a possibility that the conduction state and the interruption state are switched in the contactor 50*a*. Similarly, in each of the contactor 50*b*, the contactor 52*a*, the contactor 52*b*, the contactor 54*a*, the contactor 54*b*, the contactor 56*a*, the contactor 56*b*, the contactor 58*a*, and the contactor 58*b*, there is a possibility that the conduction state and the interruption state are switched by the impact.

In the power supply circuit 10 of the present embodiment, electric power can be supplied from both the generator 18 and the first battery 20 to the first load device 14. However, when an excessive impact is applied to the aircraft 12, there is a possibility that electric power cannot be supplied to the first load device 14 from either the generator 18 or the first battery 20. For example, when both of the contactor 52*a* of the main junction box 26 and the contactor 56*a* of the first battery junction box 30 are brought into the interruption state due to an impact, no electric power is supplied to the first load device 14. In this case, the first load device 14 cannot continue to be driven. Similarly, when an excessive impact is applied to the aircraft 12, the second load device 16 may not be able to continue to be driven.

In the power supply circuit 10 of the present embodiment, the moving direction of the movable contact 68 in each contactor of the main junction box 26 intersects with the moving direction of the movable contact 68 in each contactor of the first battery junction box 30. More specifically, the angle formed by the moving direction of the movable contact 68 in each contactor of the main junction box 26 and the moving direction of the movable contact 68 in each contactor of the first battery junction box 30 is 90°.

Further, in the power supply circuit 10 of the present embodiment, the moving direction of the movable contact 68 in each contactor of the main junction box 26 intersects with the moving direction of the movable contact 68 in each contactor of the second battery junction box 34. More specifically, the angle formed by the moving direction of the movable contact 68 in each contactor of the main junction box 26 and the moving direction of the movable contact 68 in each contactor of the second battery junction box 34 is 90°.

As a result, even when an excessive impact is applied to the aircraft 12, the power supply circuit 10 of the present embodiment can prevent the contactors of the main junction box 26 and the contactors of the first battery junction box 30 from simultaneously entering the interruption state. Therefore, electric power can be supplied from at least one of the generator 18 or the first battery 20 to the first load device 14. As a result, the first load device 14 can continue to be driven.

In addition, even when an excessive impact is applied to the aircraft 12, the power supply circuit 10 of the present embodiment can prevent the contactors of the main junction box 26 and the contactors of the second battery junction box 34 from simultaneously entering the interruption state. Therefore, electric power can be supplied from at least one of the generator 18 or the second battery 22 to the second load device 16. As a result, the second load device 16 can continue to be driven.

When the flow of electricity between the generator 18 and the first load device 14 is interrupted, the power supply circuit 10 of the present embodiment needs to maintain a state where the flow of electricity between the generator 18 and the first load device 14 is interrupted, even when an excessive impact is applied to the aircraft 12. Similarly, when the flow of electricity between the generator 18 and the second load device 16 is interrupted, it is necessary to maintain a state where the flow of electricity between the generator 18 and the second load device 16 is interrupted, even when an excessive impact is applied to the aircraft 12.

In addition, when the flow of electricity between the first battery 20 and the first load device 14 is interrupted, it is necessary to maintain a state where the flow of electricity between the first battery 20 and the first load device 14 is interrupted, even when an excessive impact is applied to the aircraft 12. Furthermore, when the flow of electricity between the second battery 22 and the second load device 16 is interrupted, it is necessary to maintain a state where the flow of electricity between the second battery 22 and the second load device 16 is interrupted, even when an excessive impact is applied to the aircraft 12.

In the power supply circuit 10 of the present embodiment, the direction in which the movable contact 68 approaches the fixed contacts 70 in the contactor 50a is opposite to the direction in which the movable contact 68 approaches the fixed contacts 70 in the contactor 50b. More specifically, the angle formed by the direction in which the movable contact 68 approaches the fixed contacts 70 in the contactor 50a and the direction in which the movable contact 68 approaches the fixed contacts 70 in the contactor 50b is 180°.

For example, when the contactor 50a is in the interruption state and the contactor 50b is in the conduction state, the flow of electricity between the generator 18 and the first load device 14 is interrupted. In this case, the flow of electricity between the generator 18 and the second load device 16 is also interrupted. When, due to an impact, the movable contact 68 approaches the fixed contacts 70 in the contactor 50a, the movable contact 68 moves away from the fixed contacts 70 in the contactor 50b. As a result, although the contactor 50a is brought into the conduction state, the contactor 50b is brought into the interruption state. As a result, a state where the flow of electricity between the generator 18 and the first load device 14 is interrupted can be maintained. In addition, a state where the flow of electricity between the generator 18 and the second load device 16 is interrupted can be maintained.

In the power supply circuit 10 of the present embodiment, the direction in which the movable contact 68 approaches the fixed contacts 70 in the contactor 52a is opposite to the direction in which the movable contact 68 approaches the fixed contacts 70 in the contactor 52b. More specifically, the angle formed by the direction in which the movable contact 68 approaches the fixed contacts 70 in the contactor 52a and the direction in which the movable contact 68 approaches the fixed contacts 70 in the contactor 52b is 180°. As a result, even when an excessive impact is applied to the aircraft 12, it is possible to maintain a state where the flow of electricity between the generator 18 and the first load device 14 is interrupted.

In the power supply circuit 10 of the present embodiment, the direction in which the movable contact 68 approaches the fixed contacts 70 in the contactor 54a is opposite to the direction in which the movable contact 68 approaches the fixed contacts 70 in the contactor 54b. More specifically, the angle formed by the direction in which the movable contact 68 approaches the fixed contacts 70 in the contactor 54a and the direction in which the movable contact 68 approaches the fixed contacts 70 in the contactor 54b is 180°. As a result, even when an excessive impact is applied to the aircraft 12, it is possible to maintain a state where the flow of electricity between the generator 18 and the second load device 16 is interrupted.

In the power supply circuit 10 of the present embodiment, the direction in which the movable contact 68 approaches the fixed contacts 70 in the contactor 56a is opposite to the direction in which the movable contact 68 approaches the fixed contacts 70 in the contactor 56b. More specifically, the angle formed by the direction in which the movable contact 68 approaches the fixed contacts 70 in the contactor 56a and the direction in which the movable contact 68 approaches the fixed contacts 70 in the contactor 56b is 180°. As a result, even when an excessive impact is applied to the aircraft 12, it is possible to maintain a state where the flow of electricity between the first battery 20 and the first load device 14 is interrupted.

In the power supply circuit 10 of the present embodiment, the direction in which the movable contact 68 approaches the fixed contacts 70 in the contactor 58a is opposite to the direction in which the movable contact 68 approaches the fixed contacts 70 in the contactor 58b. More specifically, the angle formed by the direction in which the movable contact 68 approaches the fixed contacts 70 in the contactor 58a and the direction in which the movable contact 68 approaches the fixed contacts 70 in the contactor 58b is 180°. As a result, even when an excessive impact is applied to the aircraft 12, it is possible to maintain a state where the flow of electricity between the second battery 22 and the second load device 16 is interrupted.

Modification 1

Figure 5:
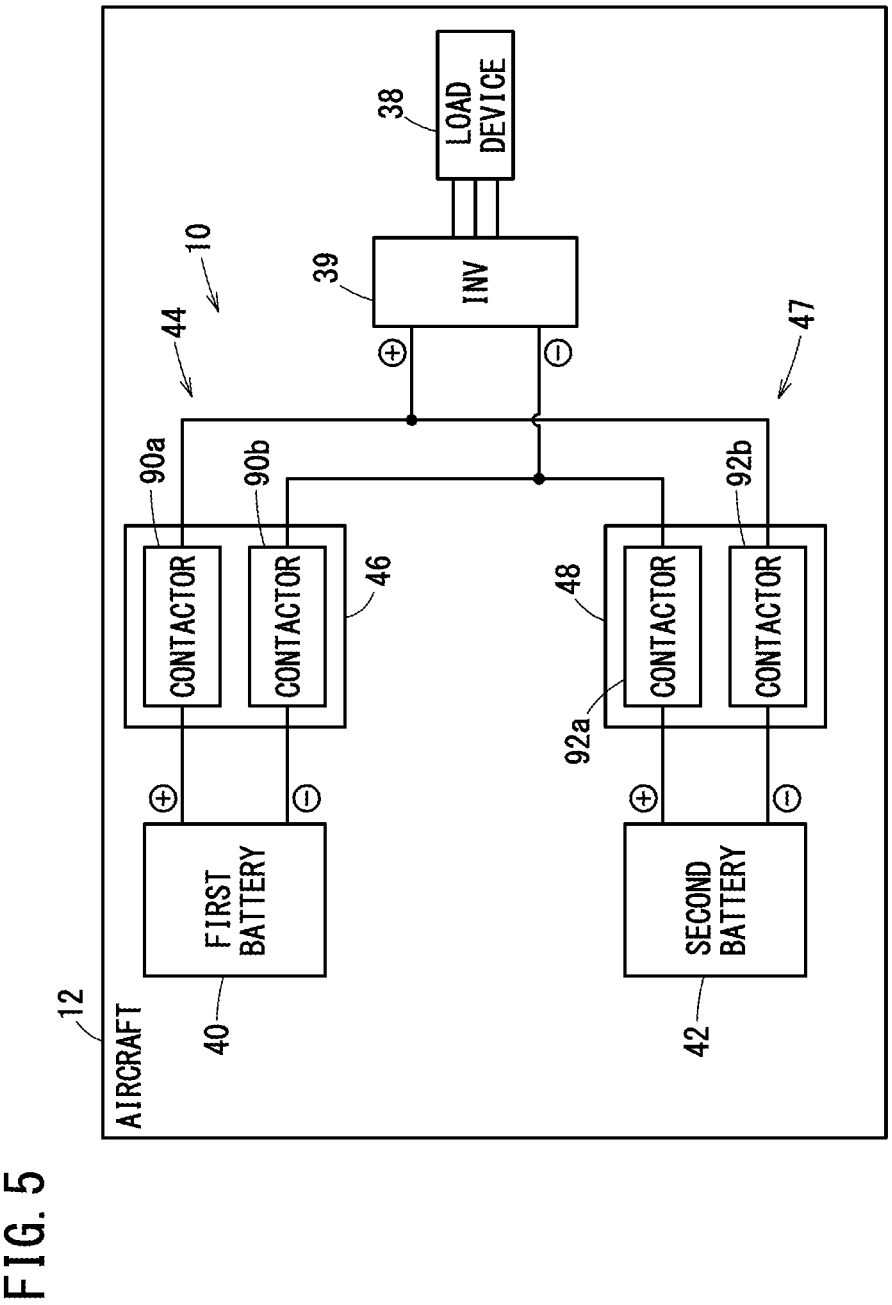
FIG. 5 is a circuit diagram of the power supply circuit.

FIG. 5 is a circuit diagram of the power supply circuit 10. The aircraft 12 includes a load device 38. The aircraft 12 includes a first battery 40 and a second battery 42. The power supply circuit 10 includes a first power transmission path 44. The first power transmission path 44 is configured to supply electric power from the first battery 40 to the load device 38.

The first power transmission path 44 is provided with a first battery junction box 46. The first battery junction box 46 includes a contactor 90a and a contactor 90b.

The contactor 90a is provided on the positive line of the first power transmission path 44. Between the first battery 40 and the load device 38, the contactor 90a switches between a conduction state in which electricity flows and an interruption state in which the flow of electricity is interrupted. The contactor 90b is provided on the negative line of the first power transmission path 44. Between the first battery 40 and the load device 38, the contactor 90b switches between a conduction state in which electricity flows and an interruption state in which the flow of electricity is interrupted.

A second power transmission path 47 is provided with a second battery junction box 48. The second battery junction box 48 includes a contactor 92a and a contactor 92b.

The contactor 92a is provided on the positive line of the second power transmission path 47. Between the second battery 42 and the load device 38, the contactor 92a switches between a conduction state in which electricity flows and an interruption state in which the flow of electricity is interrupted. The contactor 92b is provided on the negative line of the second power transmission path 47. Between the second battery 42 and the load device 38, the contactor 92b switches between a conduction state in which electricity flows and an interruption state in which the flow of electricity is interrupted.

An inverter 39 is provided between the load device 38 and the power supply circuit 10. The inverter 39 controls voltage and current. The inverter 39 steps up and down the voltage. The inverter 39 converts the DC power supplied from the first battery 40 and the second battery 42 into AC power and outputs the AC power to the load device 38.

The moving direction of the movable contact 68 in each contactor of the first battery junction box 46 intersects with the moving direction of the movable contact 68 in each contactor of the second battery junction box 48. Further, the angle formed by the moving direction of the movable contact 68 in each contactor of the first battery junction box 46 and the moving direction of the movable contact 68 in each contactor of the second battery junction box 48 is 90°.

Each contactor of the first battery junction box 46 refers to the contactor 90a and the contactor 90b. Each contactor of the second battery junction box 48 refers to the contactor 92a and the contactor 92b.

Modification 2

Figure 6:
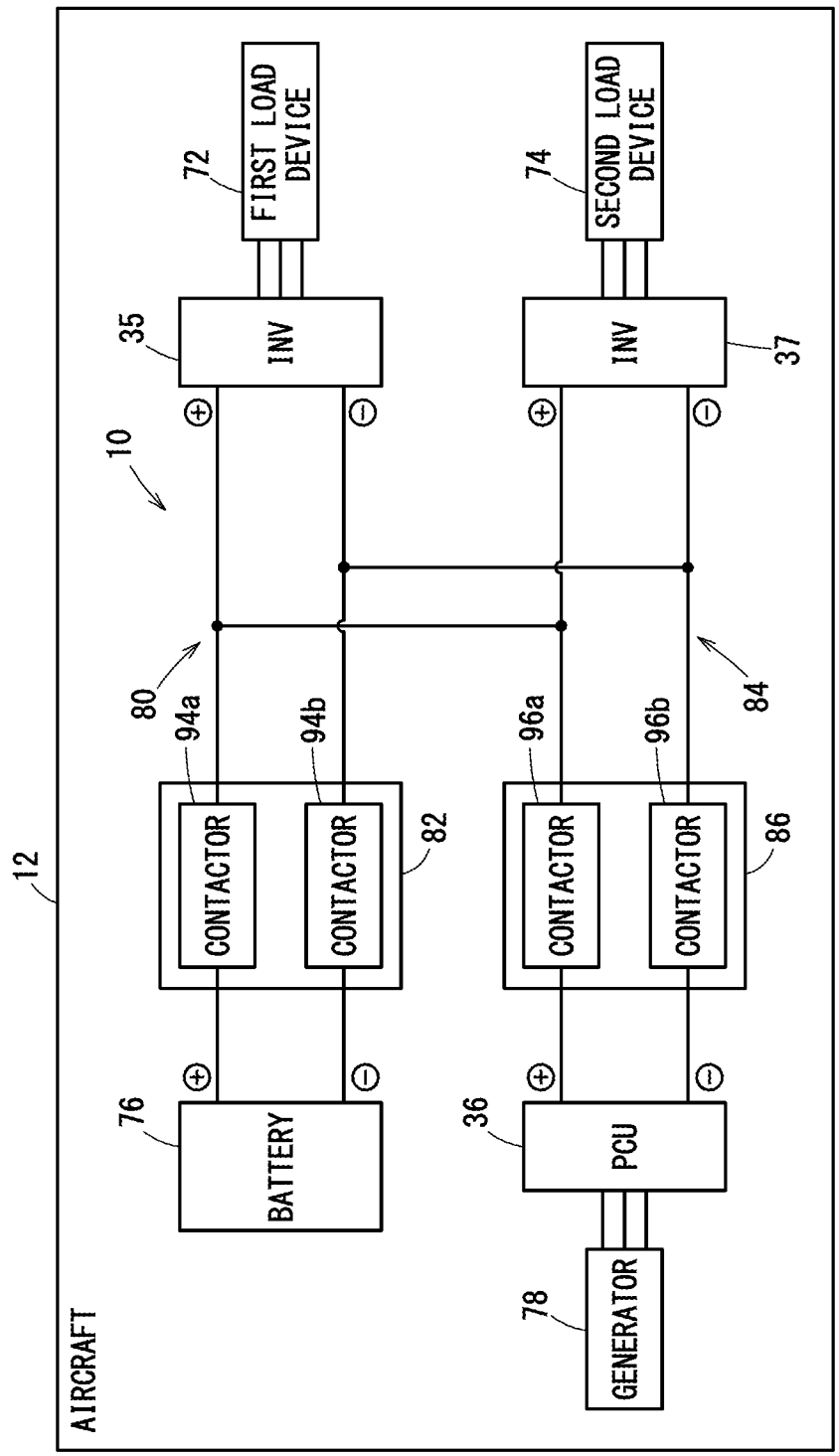
FIG. 6 is a circuit diagram of the power supply circuit.

FIG. 6 is a circuit diagram of the power supply circuit 10. The aircraft 12 includes a first load device 72 and a second load device 74. The aircraft 12 includes a battery 76 and a generator 78.

The power supply circuit 10 includes a first power transmission path 80. The first power transmission path 80 is configured to supply electric power from the battery 76 to the first load device 72 and the second load device 74.

The first power transmission path 80 is provided with a battery junction box 82. The battery junction box 82 includes a contactor 94a and a contactor 94b.

The contactor 94a is provided on the positive line of the first power transmission path 80. Between the battery 76 and the first load device 72, the contactor 94a switches between a conduction state in which electricity flows and an interruption state in which the flow of electricity is interrupted. Further, between the battery 76 and the second load device 74, the contactor 94a switches between a conduction state in which electricity flows and an interruption state in which the flow of electricity is interrupted.

The contactor 94b is provided on the negative line of the first power transmission path 80. Between the battery 76 and the first load device 72, the contactor 94b switches between a conduction state in which electricity flows and an interruption state in which the flow of electricity is interrupted. Further, between the battery 76 and the second load device 74, the contactor 94b switches between a conduction state in which electricity flows and an interruption state in which the flow of electricity is interrupted.

The power supply circuit 10 includes a second power transmission path 84. The second power transmission path 84 is configured to supply electric power from the generator 78 to the first load device 72 and the second load device 74.

The second power transmission path 84 is provided with a main junction box 86. The main junction box 86 includes a contactor 96a and a contactor 96b.

The contactor 96a is provided on the positive line of the second power transmission path 84. Between the generator 78 and the first load device 72, the contactor 96a switches between a conduction state in which electricity flows and an interruption state in which the flow of electricity is interrupted. Further, between the generator 78 and the second load device 74, the contactor 96a switches between a conduction state in which electricity flows and an interruption state in which the flow of electricity is interrupted.

The contactor 96b is provided on the negative line of the second power transmission path 84. Between the generator 78 and the first load device 72, the contactor 96b switches between a conduction state in which electricity flows and an interruption state in which the flow of electricity is interrupted. Further, between the generator 78 and the second load device 74, the contactor 96b switches between a conduction state in which electricity flows and an interruption state in which the flow of electricity is interrupted.

A PCU 36 is provided between the generator 78 and the power supply circuit 10. The PCU 36 controls voltage and current. The PCU 36 steps up and down the voltage. The PCU 36 converts the AC power generated by the generator 78 into DC power and outputs the DC power to the second power transmission path 84. The PCU 36 converts the DC power supplied from the battery 76 into AC power and outputs the AC power to the generator 78.

An inverter 35 is provided between the first load device 72 and the power supply circuit 10. Further, an inverter 37 is provided between the second load device 74 and the power supply circuit 10. The inverter 35 and the inverter 37 control voltage and current. The inverter 35 and the inverter 37 step up and down the voltage. The inverter 35 and the inverter 37 convert the DC power supplied from the PCU 36 and the battery 76 into AC power and output the AC power to the first load device 72 and the second load device 74, respectively.

The moving direction of the movable contact 68 in each contactor of the battery junction box 82 intersects with the moving direction of the movable contact 68 in each contactor of the main junction box 86. Further, the angle formed by the moving direction of the movable contact 68 in each contactor of the battery junction box 82 and the moving direction of the movable contact 68 in each contactor of the main junction box 86 is 90°.

Modification 3

In the power supply circuit 10 of the first embodiment, the angle formed by the moving direction of the movable contact 68 in each contactor of the main junction box 26 and the moving direction of the movable contact 68 in each contactor of the first battery junction box 30 is 90°. However, the angle formed by the moving direction of the movable contact 68 in each contactor of the main junction box 26 and the moving direction of the movable contact 68 in each contactor of the first battery junction box 30 may be 80° to 100°.

Even when an excessive impact is applied to the aircraft 12, the power supply circuit 10 can prevent the contactors of the main junction box 26 and the contactors of the first battery junction box 30 from simultaneously entering the interruption state. Therefore, electric power can be supplied from at least one of the generator 18 or the first battery 20 to the first load device 14. As a result, the first load device 14 can continue to be driven.

In the power supply circuit 10 of the first embodiment, the angle formed by the moving direction of the movable contact 68 in each contactor of the main junction box 26 and the moving direction of the movable contact 68 in each contactor of the second battery junction box 34 is 90°. However, the angle formed by the moving direction of the movable contact 68 in each contactor of the main junction box 26 and the moving direction of the movable contact 68 in each contactor of the second battery junction box 34 may be 80° to 100°.

Even when an excessive impact is applied to the aircraft 12, the power supply circuit 10 can prevent the contactors of the main junction box 26 and the contactors of the second battery junction box 34 from simultaneously entering the interruption state. Therefore, electric power can be supplied from at least one of the generator 18 or the second battery 22 to the second load device 16. As a result, the second load device 16 can continue to be driven.

Modification 4

The power supply circuit 10 of the first embodiment supplies electric power to two loads, namely, the first load device 14 and the second load device 16. On the other hand, the power supply circuit 10 may supply electric power to one load. In this case, electric power may be supplied to one load from a plurality of power sources.

Furthermore, the power supply circuit 10 may supply electric power to three or more loads. In this case, electric power may be supplied to each load from a plurality of power sources.

Modification 5

In the first embodiment, the contactor 50a, the contactor 52a, and the contactor 54a are provided on the positive line of the first power transmission path 24. Further, the contactor 50b, the contactor 52b, and the contactor 54b are provided on the negative line of the first power transmission path 24. However, the contactor 50b on the negative line of the first power transmission path 24 may be omitted. In this case, the contactor 52a and the contactor 54a on the positive line of the first power transmission path 24 may be omitted. Furthermore, the contactor 50a on the positive line of the first power transmission path 24 may be omitted. In this case, the contactor 52b and the contactor 54b on the negative line of the first power transmission path 24 may be omitted.

Note that the present invention is not limited to the above disclosure, and various modifications are possible without departing from the essence and gist of the present invention.

In the first embodiment, the power supply circuit 10 is mounted on the aircraft 12. However, the power supply circuit 10 may be mounted not only on the aircraft 12 but also on various moving objects such as ships, automobiles, and trains.

Invention Obtained from Embodiment

The invention that can be grasped from the above embodiment will be described below.

The power supply circuit (10) of the moving object (12) includes the first power transmission path (24) configured to transmit electric power from the first power source (18) to the load (14, 16); the second power transmission path (28, 32) configured to transmit electric power from the second power source (20, 22) to the load; the first contactor (50a) provided on the first power transmission path and configured to switch between a conduction state in which electricity flows and an interruption state in which flow of electricity is interrupted, between the first power source and the load; and the second contactor (56a, 58a) provided on the second power transmission path and configured to switch between the conduction state and the interruption state, between the second power source and the load, wherein the first contactor includes the first fixed contact (70), and the first movable contact (68) configured to move relative to the first fixed contact, the second contactor includes the second fixed contact (70), and the second movable contact (68) configured to move relative to the second fixed contact, and the moving direction of the first movable contact intersects with the moving direction of the second movable contact. As a result, even when an excessive impact is applied to the moving object, electric power can be supplied from at least one of the first power source or the second power source to the load.

In the above-described power supply circuit of the moving object, the angle formed by the moving direction of the first movable contact and the moving direction of the second movable contact may be 80° to 100°. As a result, even when an excessive impact is applied to the moving object, electric power can be supplied from at least one of the first power source or the second power source to the load.

In the above-described power supply circuit of the moving object, the angle formed by the moving direction of the first movable contact and the moving direction of the second movable contact may be 90°. As a result, even when an excessive impact is applied to the moving object, electric power can be supplied from at least one of the first power source or the second power source to the load.

The above-described power supply circuit of the moving object may further include: the third contactor (50b) provided on the first power transmission path and configured to switch between the conduction state and the interruption state, between the first power source and the load; and the fourth contactor (56b, 58b) provided on the second power transmission path and configured to switch between the conduction state and the interruption state, between the second power source and the load, wherein the third contactor may include the third fixed contact (70), and the third movable contact (68) configured to move relative to the third fixed contact, the fourth contactor may include the fourth fixed contact (70), and the fourth movable contact (68) configured to move relative to the fourth fixed contact, the direction in which the first movable contact approaches the first fixed contact may be opposite to the direction in which the third movable contact approaches the third fixed contact, and the direction in which the second movable contact approaches the second fixed contact may be opposite to the direction in which the fourth movable contact approaches the fourth fixed contact. As a result, it is possible to maintain a state where the flow of electricity between the first power source and the load is interrupted. In addition, it is possible to maintain a state where the flow of electricity between the second power source and the load is interrupted.

In the above-described power supply circuit of the moving object, the angle formed by the direction in which the first movable contact approaches the first fixed contact and the direction in which the third movable contact approaches the third fixed contact may be 180°, and the angle formed by the direction in which the second movable contact approaches the second fixed contact and the direction in which the fourth movable contact approaches the fourth fixed contact may be 180°. As a result, it is possible to maintain a state where the flow of electricity between the first power source and the load is interrupted. In addition, it is possible to maintain a state where the flow of electricity between the second power source and the load is interrupted.

The invention claimed is:

1. A power supply circuit of a moving object, the power supply circuit comprising:

a first power transmission path configured to transmit electric power from a first power source to a load;
a second power transmission path configured to transmit electric power from a second power source to the load;
a first contactor provided on the first power transmission path and configured to switch between a conduction state in which electricity flows and an interruption state in which flow of electricity is interrupted, between the first power source and the load; and
a second contactor provided on the second power transmission path and configured to switch between the conduction state and the interruption state, between the second power source and the load,
wherein the first contactor includes a first fixed contact, and a first movable contact configured to move relative to the first fixed contact,
the second contactor includes a second fixed contact, and a second movable contact configured to move relative to the second fixed contact, and
a moving direction of the first movable contact intersects with a moving direction of the second movable contact.

2. The power supply circuit of the moving object according to claim 1, wherein
an angle formed by the moving direction of the first movable contact and the moving direction of the second movable contact is 80° to 100°.

3. The power supply circuit of the moving object according to claim 2, wherein
the angle formed by the moving direction of the first movable contact and the moving direction of the second movable contact is 90°.

4. The power supply circuit of the moving object according to claim 1, further comprising:

a third contactor provided on the first power transmission path and configured to switch between the conduction state and the interruption state, between the first power source and the load; and
a fourth contactor provided on the second power transmission path and configured to switch between the conduction state and the interruption state, between the second power source and the load,
wherein the third contactor includes a third fixed contact, and a third movable contact configured to move relative to the third fixed contact,
the fourth contactor includes a fourth fixed contact, and a fourth movable contact configured to move relative to the fourth fixed contact,
a direction in which the first movable contact approaches the first fixed contact is opposite to a direction in which the third movable contact approaches the third fixed contact, and
a direction in which the second movable contact approaches the second fixed contact is opposite to a direction in which the fourth movable contact approaches the fourth fixed contact.

5. The power supply circuit of the moving object according to claim 4, wherein
an angle formed by the direction in which the first movable contact approaches the first fixed contact and the direction in which the third movable contact approaches the third fixed contact is 180°, and
an angle formed by the direction in which the second movable contact approaches the second fixed contact and the direction in which the fourth movable contact approaches the fourth fixed contact is 180°.

* * * * *